United States Patent
Yokoyama et al.

(10) Patent No.: US 9,970,364 B2
(45) Date of Patent: May 15, 2018

(54) VEHICLE INCLUDING INTERNAL COMBUSTION ENGINE FOR DRIVING GENERATOR

(71) Applicant: MAZDA MOTOR CORPORATION, Hiroshima (JP)

(72) Inventors: Tetsuya Yokoyama, Higashihiroshima (JP); Kiyotaka Tanaka, Hiroshima (JP); Hiromi Yoshioka, Hiroshima (JP); Yasutaka Sakura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 15/258,813

(22) Filed: Sep. 7, 2016

(65) Prior Publication Data
US 2017/0074176 A1 Mar. 16, 2017

(30) Foreign Application Priority Data
Sep. 11, 2015 (JP) .................................. 2015-180143

(51) Int. Cl.
*F02D 29/06* (2006.01)
*B60K 6/46* (2007.10)
(Continued)

(52) U.S. Cl.
CPC .............. *F02D 29/06* (2013.01); *B60K 6/46* (2013.01); *B60W 10/06* (2013.01); *B60W 10/08* (2013.01);
(Continued)

(58) Field of Classification Search
CPC ... F02D 29/06; F02D 41/0235; F02D 41/0255
See application file for complete search history.

(56) References Cited

U.S. PATENT DOCUMENTS 6,253,866 B1 * 7/2001 Kojima .................. B60K 6/445
180/165
6,321,530 B1 * 11/2001 Hoshi .................. F01N 13/0093
180/65.25
(Continued)

FOREIGN PATENT DOCUMENTS

JP H09-085054 A 3/1997
JP 2003-227366 A 8/2003
(Continued)

*Primary Examiner* — Brian L Swenson
(74) *Attorney, Agent, or Firm* — Studebaker & Brackett PC (57) ABSTRACT

A vehicle includes a generator, an internal combustion engine for driving the generator, a catalytic device, and a controller for controlling the operation of the internal combustion engine. At a start of the internal combustion engine to allow the generator to start generating electricity, the controller, until the catalytic device reaches an activated state, operates the internal combustion engine in a warm-up mode such that the driving force of the internal combustion engine for driving the generator is below a value at which electricity is generated, and the controller, after the catalytic device reaches the activated state, operates the internal combustion engine in an electricity generating operating mode such that the driving force of the internal combustion engine is enhanced to the value at which electricity is generated to allow the generator to generate a predetermined quantity of electricity.

12 Claims, 4 Drawing Sheets

(51) Int. Cl.
*F01N 3/20* (2006.01)
*F02D 41/02* (2006.01)
*H02J 7/14* (2006.01)
*B60W 10/06* (2006.01)
*B60W 10/08* (2006.01)
*B60W 20/16* (2016.01)
*B60W 20/00* (2016.01)

(52) U.S. Cl.
CPC ............... *B60W 20/16* (2016.01); *F01N 3/20* (2013.01); *F01N 3/2013* (2013.01); *F02D 41/0235* (2013.01); *H02J 7/14* (2013.01); *H02J 7/1438* (2013.01); *B60W 20/00* (2013.01); *B60W 2510/068* (2013.01); *B60W 2710/0677* (2013.01); *F01N 2240/16* (2013.01); *F01N 2430/00* (2013.01); *F01N 2590/11* (2013.01); *F02D 41/0255* (2013.01); *Y02A 50/2322* (2018.01); *Y02T 10/26* (2013.01)

(56) References Cited

U.S. PATENT DOCUMENTS

| | | | | |
|---|---|---|---|---|
| 6,327,852 B1* | 12/2001 | Hirose | ................... | B60K 6/445 180/65.235 |
| 6,459,166 B2* | 10/2002 | Yanase | ..................... | B60K 6/46 123/179.28 |
| 6,657,315 B1* | 12/2003 | Peters | .................... | B60K 6/485 180/65.26 |
| 2002/0049115 A1* | 4/2002 | Suzuki | ................... | B60K 6/445 477/3 |
| 2003/0145582 A1* | 8/2003 | Bunting | ................. | F01N 3/023 60/297 |
| 2010/0268438 A1* | 10/2010 | Hiranuma | .............. | F01N 13/009 701/102 |
| 2010/0280740 A1* | 11/2010 | Oe | ........................ | B60W 20/15 701/102 |
| 2012/0102922 A1* | 5/2012 | Ramanathan | ......... | F01N 3/2013 60/274 |
| 2013/0255227 A1* | 10/2013 | Gonze | ...................... | F01N 9/00 60/274 |
| 2014/0230414 A1* | 8/2014 | Kumagai | .............. | F01N 3/2026 60/286 |
| 2014/0352283 A1* | 12/2014 | Kumagai | .............. | F01N 3/2013 60/286 |

FOREIGN PATENT DOCUMENTS

| | | |
|---|---|---|
| JP | 2012-250653 A | 12/2012 |
| JP | 2014-012518 A | 1/2014 |
| WO | 2008/081153 A1 | 7/2008 |

* cited by examiner

VEHICLE INCLUDING INTERNAL COMBUSTION ENGINE FOR DRIVING GENERATOR

CROSS-REFERENCE TO RELATED APPLICATION

This application claims priority to Japanese Patent Application No. 2015-180143 filed on Sep. 11, 2015, the entire disclosure of which is incorporated by reference herein.

BACKGROUND

The technique disclosed herein relates to a vehicle including an internal combustion engine for driving a generator.

Japanese Unexamined Patent Publication No. H09-85054 discloses a vehicle including a catalytic system with an electric heater. In this vehicle, a first catalytic portion is disposed in an upstream portion of an exhaust passage, and a second catalytic portion is disposed downstream of the first catalytic portion. The electric heater is disposed upstream of the first catalytic portion. The electric heater heats the first catalytic portion to promote activation of the first catalytic portion.

Japanese Unexamined Patent Publication No. 2014-12518 discloses a hybrid vehicle including an electric motor for traveling and an internal combustion engine configured to output a driving force for traveling. In this vehicle, if a catalytic device disposed in an exhaust passage of the internal combustion engine needs to be warmed up, the internal combustion engine is operated while its output is reduced, and the insufficient output is compensated by an output from the motor. This reduces degradation of emission performance.

SUMMARY

In a vehicle including a generator configured to generate electricity for travelling and an internal combustion engine configured to drive the generator, the internal combustion engine may start its operation during travelling with a catalytic device inactive. In particular, in an electric vehicle including a range extender for extending its cruising distance, and a so-called plug-in hybrid vehicle, when a battery state of charge (SOC) is lowered, the operation of the internal combustion engine is started to allow the generator to start generating electricity. The start frequency of the internal combustion engine is low in these vehicles. Thus, in many cases, the catalytic device may be inactive at a start of the internal combustion engine. If the output from the internal combustion engine is increased so much as to allow the generator to generate electricity with the catalytic device remaining inactive, emissions are disadvantageously exhausted into the atmosphere. At the time of start of the internal combustion engine, emission performance is disadvantageously degraded.

The technique disclosed herein has been developed in view of the foregoing background. This technique is advantageous to, in a vehicle including an internal combustion engine for driving a generator, reduce degradation of emission performance at a start of the internal combustion engine.

Specifically, the technique disclosed herein relates a vehicle including an internal combustion engine for driving a generator. This vehicle includes: a generator mounted in the vehicle and configured to generate electricity for travelling; an internal combustion engine coupled to the generator and configured to drive the generator; a catalytic device provided in an exhaust passage of the internal combustion engine and configured to purify exhaust gas exhausted from the internal combustion engine during the operation of the internal combustion engine; and a controller configured to control the operation of the internal combustion engine.

At a start of the internal combustion engine to allow the generator to start generating electricity, the controller, until the catalytic device reaches an activated state, operates the internal combustion engine in a warm-up mode such that the driving force of the internal combustion engine for driving the generator is below a value at which electricity is generated after the catalytic device reaches the activated state. After the catalytic device reaches the activated state, the controller operates the internal combustion engine in an electricity generating operating mode such that the driving force of the internal combustion engine is enhanced to the value at which electricity is generated to allow the generator to generate a predetermined quantity of electricity.

DETAILED DESCRIPTION

The technique disclosed herein relates a vehicle including an internal combustion engine for driving a generator. This vehicle includes: a generator mounted in the vehicle and configured to generate electricity for travelling; an internal combustion engine coupled to the generator and configured to drive the generator; a catalytic device provided in an exhaust passage of the internal combustion engine and configured to purify exhaust gas exhausted from the internal combustion engine during the operation of the internal combustion engine; and a controller configured to control the operation of the internal combustion engine.

At a start of the internal combustion engine to allow the generator to start generating electricity, the controller, until the catalytic device reaches an activated state, operates the internal combustion engine in a warm-up mode such that the driving force of the internal combustion engine for driving the generator is below a value at which electricity is generated after the catalytic device reaches the activated state. After the catalytic device reaches the activated state, the controller operates the internal combustion engine in an electricity generating operating mode such that the driving force of the internal combustion engine is enhanced to the value at which electricity is generated to allow the generator to generate a predetermined quantity of electricity (i.e., substantial electricity generation).

According to this configuration, at the start of the internal combustion engine to allow the generator to start generating electricity, until the catalytic device reaches an activated state, the internal combustion engine is operated such that the driving force of the internal combustion engine for driving the generator is below the value at which a predetermined quantity of electricity is generated after the catalytic device reaches the activated state (i.e., the warm-up mode). In the warm-up mode, the internal combustion engine is operated at a low rotational speed and a low load, i.e., the engine rotational speed is higher than an idling rotational speed and the engine is under a load. The generator is in an electricity generating state, i.e., it generates a smaller quantity of electricity than the predetermined quantity of electricity. In the warm-up mode, the internal combustion engine is operated while performing combustion. This raises the temperature of the exhaust gas to raise the temperature of the catalytic device. However, since the output from the internal combustion engine is low and a smaller quantity of fuel is supplied to the internal combustion engine, a smaller amount of emissions is exhausted from the internal combustion engine. With the gradual rise in temperature of the catalytic device in the warm-up mode, the purification rate of the catalytic device is enhanced. This avoids degradation of emission performance. In the warm-up mode, the activation of the catalytic device is promoted while degradation of the emission performance is avoided.

After the catalytic device reaches the activation state, the output from the internal combustion engine is enhanced. This allows the generator to start generating a predetermined quantity of electricity (i.e., the electricity generating operating mode). In the electricity generating operating mode, the catalytic device is active to avoid degradation of emission performance.

When the internal combustion engine is started to allow the generator to substantially generate electricity, the warm-up mode is implemented prior to the start of generating electricity. This avoids degradation of the emission performance. This also allows the generator to rapidly start substantially generating electricity.

The catalytic device may include a front stage catalytic portion and a rear stage catalytic portion disposed downstream of the front stage catalytic portion. The controller may implement the electricity generating operating mode after the front stage catalytic portion reaches an activated state in the warm-up mode.

The front stage catalytic portion is located closer to the internal combustion engine than the rear stage catalytic portion is, and thus, can be activated earlier. In the warm-up mode, the activation of the front stage catalytic portion is promoted. The front stage catalytic portion is activated earlier to further reduce the exhaust of emissions during the warm-up mode.

After the catalytic device reaches the activation state, the degradation of emission performance is reduced even if the output from the internal combustion engine is enhanced. When the front stage catalytic portion reaches the activated state, the warm-up mode is ended, and the electricity generating operating mode is started. This allows the generator to rapidly start substantially generating electricity. In the electricity generating operating mode, the output from the internal combustion engine is enhanced to raise the temperature of exhaust gas. Thus, the rear stage catalytic portion is also rapidly activated. If the rear stage catalytic portion is activated, the emission performance is improved.

The controller, after switching from the warm-up mode to the electricity generating operating mode, may change the operating state of the internal combustion engine such that the ability of the generator to generate electricity is gradually enhanced. That is to say, immediately after a switch is made to the electricity generating operating mode, the output from the internal combustion engine is gradually, not abruptly, enhanced with, e.g., an increase in purification rate of the catalytic device in the electricity generating operating mode. This may further improve the emission performance.

The vehicle including the internal combustion engine for driving the generator may further include an electric heater disposed upstream of the catalytic device in the exhaust passage and configured to heat the catalytic device. The controller may implement an initial mode of heating the catalytic device by operating the electric motor prior to the warm-up mode.

In the initial mode, the electric heater heats the catalytic device. In the initial mode, the internal combustion engine is not operated, thereby making it possible to promote activation of the catalytic device without exhausting the emissions into the atmosphere.

The generator may be a generator motor capable of driving the internal combustion engine, and the controller may allow the generator to drive the internal combustion engine in the initial mode.

Driving the internal combustion engine generates a gas flow in the exhaust passage in an upstream-to-downstream direction. The heat generated at the electric heater is sent to the catalytic device together with this gas flow. This may efficiently raise the temperature of the catalytic device.

The catalytic device may include a front stage catalytic portion and a rear stage catalytic portion disposed downstream of the front stage catalytic portion. The controller may allow the electric heater to heat the catalytic device until the front stage catalytic portion reaches an activated state prior to the warm-up mode, and may implement the warm-up mode after the front stage catalytic portion reaches the activated state. The controller may also implement the electricity generating operating mode after the rear stage catalytic portion reaches an activated state in the warm-up mode.

In the initial mode prior to the warm-up mode, the electric heater activates the front stage catalytic portion. This may promote activation of the front stage catalytic portion without operating the internal combustion engine. After the front stage catalytic portion reaches the activated state, the internal combustion engine is started. This ensures emission performance since the front stage catalytic portion is activated.

In the warm-up mode, high-temperature exhaust gas exhausted from the internal combustion engine promotes the activation of the rear stage catalytic portion. This may rapidly raise the temperature of the rear stage catalytic portion while avoiding degradation of emission performance. In the warm-up mode of operating the internal combustion engine, the operation of the electric heater is stopped. This reduces electricity consumption. Also, the electric heater is used only to activate the front stage catalytic portion, and thereby may have a small capacity. This may reduce the size and weight of the electric heater.

If the front and rear stage catalytic portions are both activated, the electricity generating operating mode is implemented. Thus, the output from the internal combustion engine is enhanced to substantially start generating electricity. This improves the emission performance since the front and rear stage catalytic portions are both activated.

The controller may receive a count signal from a timer, and may output a signal for switching from the warm-up mode to the electricity generating operating mode upon elapse of a preset duration based on the count signal.

The controller also may output a signal for switching from the initial mode to the warm-up mode upon elapse of a preset duration based on the count signal.

Furthermore, the controller may output a signal for stopping the electric heater and a signal for starting the warm-up mode upon elapse of a first preset duration based on the count signal, and also output a signal for switching from the warm-up mode to the electricity generating operating mode upon elapse of a second preset duration based on the count signal.

The vehicle may include a travelling electric motor configured to be operated with electricity of a battery, and the generator and the internal combustion engine may serve as a range extender configured to extend a cruising distance of the vehicle if the SOC of the battery is lowered.

In the electric vehicle including the range extender, the internal combustion engine is started to start generating electricity (i.e., the electricity generating operating mode is implemented to start the original electricity generation) if the SOC of the battery is lowered. Thus, the start frequency of the internal combustion engine is low. At the start of the internal combustion engine, the catalytic device is mostly inactive. The technique disclosed herein, as stated above, implements at least the warm-up mode prior to generation of electricity by the generator even if the catalytic device is inactive. This avoids degradation of emission performance at the start of the internal combustion engine. Accordingly, the technique disclosed herein is suitable to a range extender electric vehicle. The technique disclosed herein is also applicable to a plug-in hybrid vehicle in which the start frequency of the internal combustion engine is low as in the range extender electric vehicle.

The vehicle disclosed herein includes: a generator mounted in the vehicle and configured to generate electricity for travelling; an internal combustion engine coupled to the generator and configured to drive the generator; a catalytic device provided in an exhaust passage of the internal combustion engine and configured to purify exhaust gas exhausted from the internal combustion engine during the operation of the internal combustion engine; a catalyst temperature obtaining unit configured to obtain a temperature information of the catalytic device; and an engine controller configured to receive a signal from the catalyst temperature obtaining unit and output a control signal to the internal combustion engine.

At a start of the internal combustion engine to allow the generator to start generating electricity, the engine controller, until the catalytic device reaches an activated state based on a signal from the catalyst temperature obtaining unit, outputs a signal for operating the internal combustion engine such that the driving force of the internal combustion engine for driving the generator is below a value at which electricity is generated after the catalytic device reaches the activated state, and the engine controller, after the catalytic device reaches the activated state based on a signal from the catalyst temperature obtaining unit, also outputs a signal for operating the internal combustion engine such that the driving force of the internal combustion engine is enhanced to the value at which electricity is generated to allow the generator to generate a predetermined quantity of electricity.

The vehicle may further includes an electric heater disposed downstream of the catalytic device in the exhaust passage and configured to heat the catalytic device. The engine controller may output a signal for operating the electric heater prior to the start of the internal combustion engine, and outputs, based on a signal from the catalyst temperature obtaining unit, a signal for stopping the electric heater and a signal for starting the internal combustion engine.

The internal combustion engine may include an injector configured to inject fuel that is to be supplied to a chamber, a spark plug configured to ignite an air-fuel mixture in the chamber, and a throttle valve configured to regulate the amount of air that is to be introduced into the chamber. The engine controller may output a control signal to each of the injector, the spark plug, and the throttle valve.

A method of driving a generator using an internal combustion engine in a vehicle includes: starting the internal combustion engine configured to drive the generator; until a catalytic device configured to purify exhaust gas exhausted from the internal combustion engine reaches an activated state, operating the internal combustion engine such that the driving force of the internal combustion engine for driving the generator is below a value at which electricity is generated after the catalytic device reaches the activated state; and, after the catalytic device reaches the activated state, operating the internal combustion engine such that the driving force of the internal combustion engine is enhanced to the value at which electricity is generated to allow the generator to generate a predetermined quantity of electricity.

The above method may further include changing the operating state of the internal combustion engine such that the ability of the generator to generate electricity is gradually enhanced.

The above method may further include operating an electric heater configured to heat the catalytic device prior to the start of the internal combustion engine.

The above method may still further include driving the internal combustion engine by the generator where the electric heater is in operation.

Figure 1:
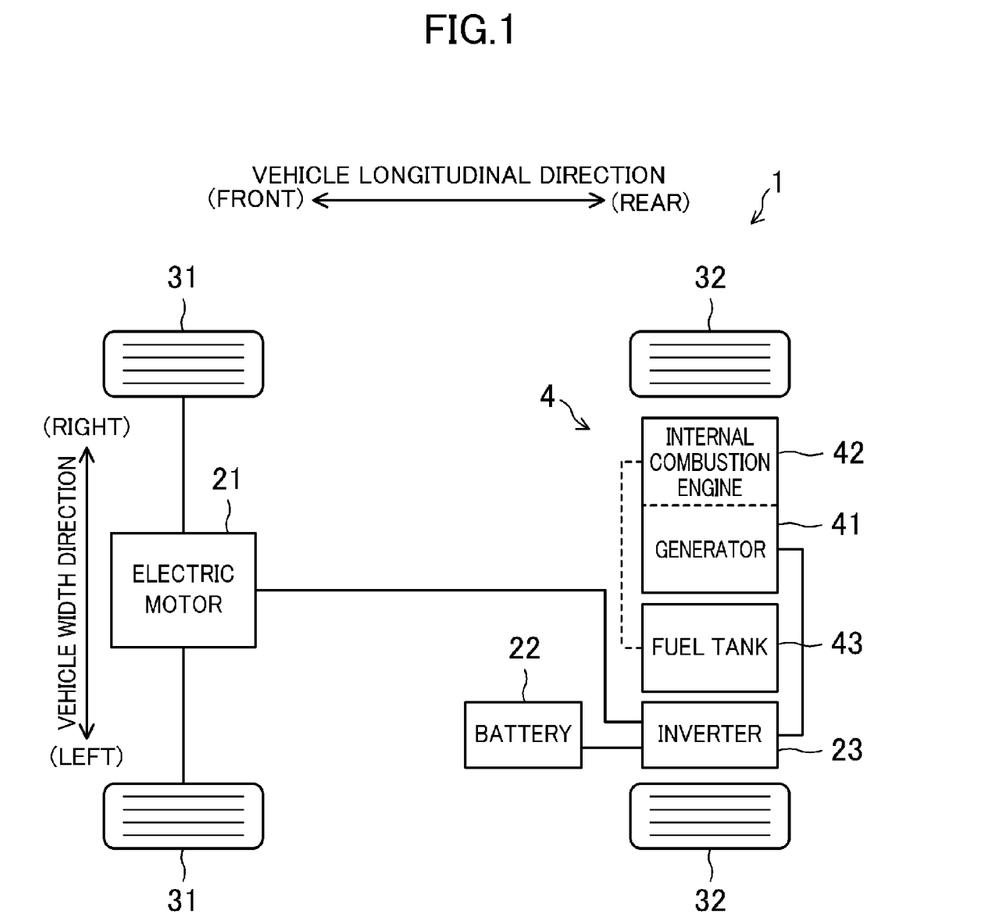
FIG. 1 illustrates a configuration for a vehicle including an internal combustion engine for driving a generator.

The vehicle including an internal combustion engine for driving a generator disclosed herein will now be described with reference to the drawings. The following description is a mere example. FIG. 1 illustrates a configuration of a vehicle including an internal combustion engine for driving a generator. This vehicle is an electric vehicle 1. This electric vehicle 1 includes a charging plug through which a battery 22 can be charged with electricity by a standard charger or quick charger, although it is not illustrated. This electric vehicle 1 also includes a range extender 4 for extending its cruising distance.

As illustrated in FIG. 1, this electric vehicle 1 includes an electric motor 21 for travelling, the battery 22, and an inverter 23. The battery 22 accumulates electricity for travelling. The battery 22 is configured as a lithium-ion battery, for example, but is not limited to the lithium-ion battery. The electric motor 21 is supplied with electricity from the battery 22 via the inverter 23. The electric motor 21 drives driving wheels, i.e., front wheels 31 in the example of FIG. 1. Driving the front wheels 31 allows the electric vehicle 1 to travel. The electric motor 21 also functions as a generator at, e.g., deceleration. The battery 22 is charged with regenerative electricity.

The range extender 4 has a generator 41, an internal combustion engine 42 configured to drive the generator 41, and a fuel tank 43 configured to store fuel that is to be supplied to the internal combustion engine 42. The generator 41 generates electricity with which the battery 22 is charged. The electricity generated by the drive of the generator 41 is supplied to the battery 22 via the inverter 23. The generator 41 is driven by receiving electricity supplied from the battery 22 to also function as a starter for starting the internal combustion engine 42, as described later.

The internal combustion engine 42 has an output shaft coupled to the generator 41, although it is not specifically illustrated. The internal combustion engine 42 is operated by receiving fuel supplied from the fuel tank 43. The operation of the internal combustion engine 42 drives the generator 41 to allow the generator 41 to generate electricity. In this example, the internal combustion engine 42 is a small rotary piston engine with one rotor.

Figure 2:
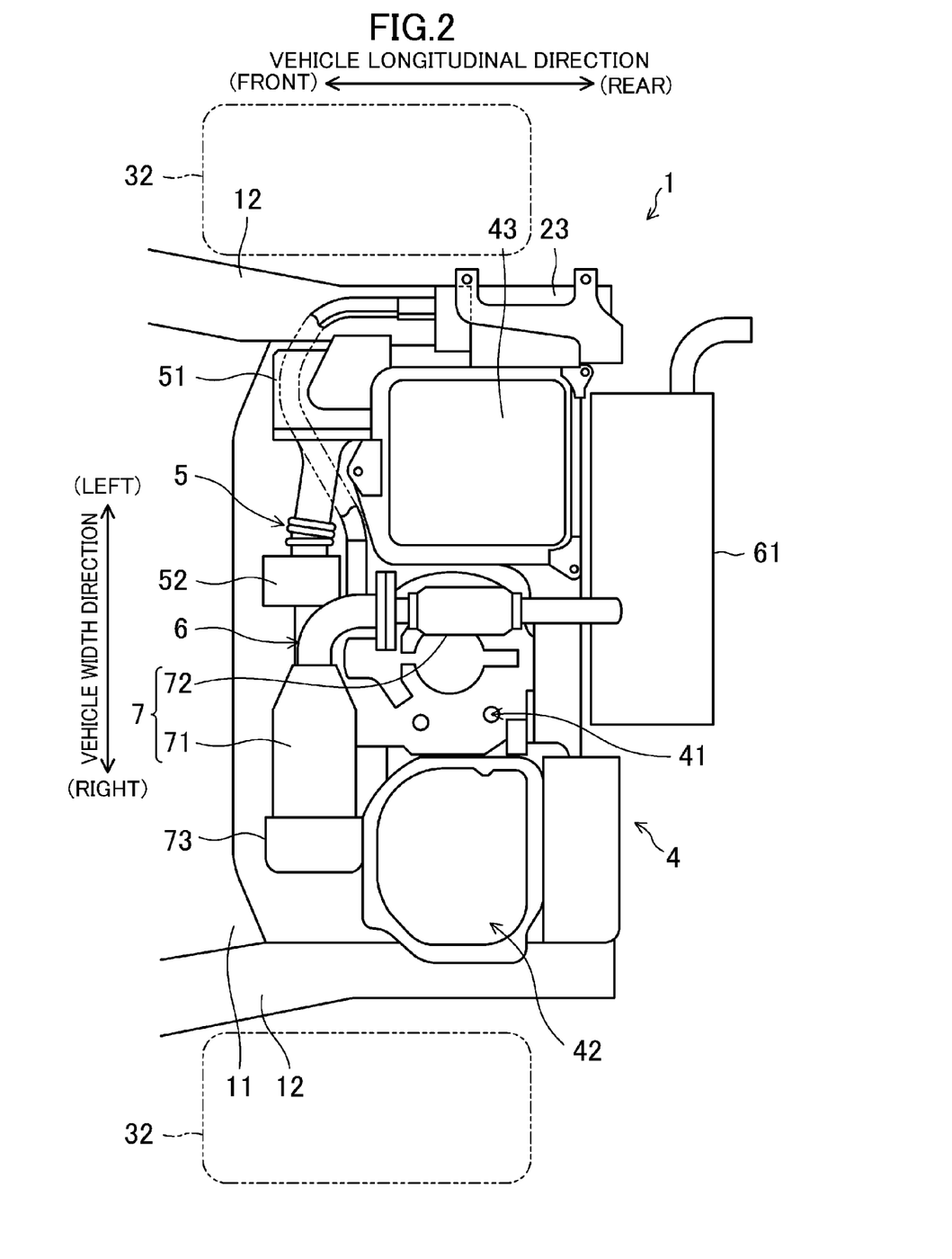
FIG. 2 is a bottom view illustrating a configuration for a range extender.

FIG. 2 illustrates a configuration of the rear part of the electric vehicle 1. FIG. 2 is a bottom view of the rear part of the electric vehicle 1. The range extender 4 is provided as a unit, and is mounted in the rear part of the electric vehicle 1. Specifically, the range extender 4 is disposed behind a rear cross member 11 extending in the vehicle width direction and between a pair of rear side frames 12, 12 extending in the vehicle longitudinal direction. The range extender 4 is disposed between right and left rear wheels 32, 32.

As described above, the internal combustion engine 42 configured as a small rotary piston engine with one rotor is disposed in the right-handed portion of the vehicle in the vehicle width direction. The rotary piston engine has a substantially triangular rotor, a rotor housing which houses the rotor, and a pair of side housings which sandwich the rotor housing therebetween to delimit a rotor housing chamber, although they are not specifically illustrated. In three chambers formed between the trochoid inner peripheral surface of the rotor housing and the rotor, intake, compression, expansion, and exhaust strokes take place, thereby generating a rotating force of the rotor. The rotating force of the rotor is output from an eccentric shaft serving as an output shaft of the rotary piston engine. In this example, the internal combustion engine 42 is disposed such that the eccentric shaft extends vertically. An intake port of the internal combustion engine 42 is, not specifically illustrated, provided in the rotor housing, and is opened forward in the vehicle longitudinal direction. An exhaust port of the internal combustion engine 42 is provided in the side housing in the front part of the internal combustion engine 42, and is opened forward.

An intake passage 5 and an exhaust passage 6 are connected to the internal combustion engine 42. The intake passage 5 is disposed forward of the internal combustion engine 42 so as to extend leftward in the vehicle width direction. An air cleaner 51 attached to the left end of the intake passage 5 is disposed in the left-handed portion of the vehicle in the vehicle width direction. The intake passage 5 is provided with a throttle body 52 housing the throttle valve 423 (see FIG. 3) in its midway.

The exhaust passage 6 is disposed forward of the internal combustion engine 42 and below the intake passage 5. The exhaust passage 6 is also disposed so as to extend leftward in the vehicle width direction. The exhaust passage 6 is bent at substantially the intermediate portion in the vehicle width direction so as to extend backward in the vehicle longitudinal direction. The rear end of the exhaust passage 6 is connected to a silencer 61.

A catalytic device 7 is provided in the midway of the exhaust passage 6. The catalytic device 7 has a front stage catalytic portion 71 disposed in an upstream portion of the exhaust passage 6, and a rear stage catalytic portion 72 disposed downstream of the front stage catalytic portion 71. The front and rear stage catalytic portions 71 and 72 each house a three-way catalyst. An electrically heated catalyst (EHC) 73, functioning as an electric heater, is disposed upstream of the front stage catalytic portion 71. The EHC 73 and the front stage catalytic portion 71 are integrated together, and disposed so as to extend in the vehicle width direction in the example of the figure. The rear stage catalytic portion 72 is disposed so as to extend in the vehicle longitudinal direction in the example of the figure.

The generator 41 is disposed on the left side of the internal combustion engine 42 in the vehicle width direction. The generator 41 is disposed around the intermediate portion of the electric vehicle 1 in the vehicle width direction. The output shaft of the internal combustion engine 42 and the rotating shaft of the generator 41 are coupled together through an endless member such as a belt, which is not illustrated.

The fuel tank 43 is disposed on the left side of the generator 41 in the vehicle width direction. The fuel tank 43 is formed into a shape close to a cube. The fuel tank 43 of the range extender 4 has a predetermined limited capacity. The fuel tank 43 is connected to an internal combustion engine 42 through a fuel supply pipe, although it is not illustrated in FIG. 2. The inverter 23 is disposed on the left side of the fuel tank 43 in the vehicle width direction.

Figure 3:
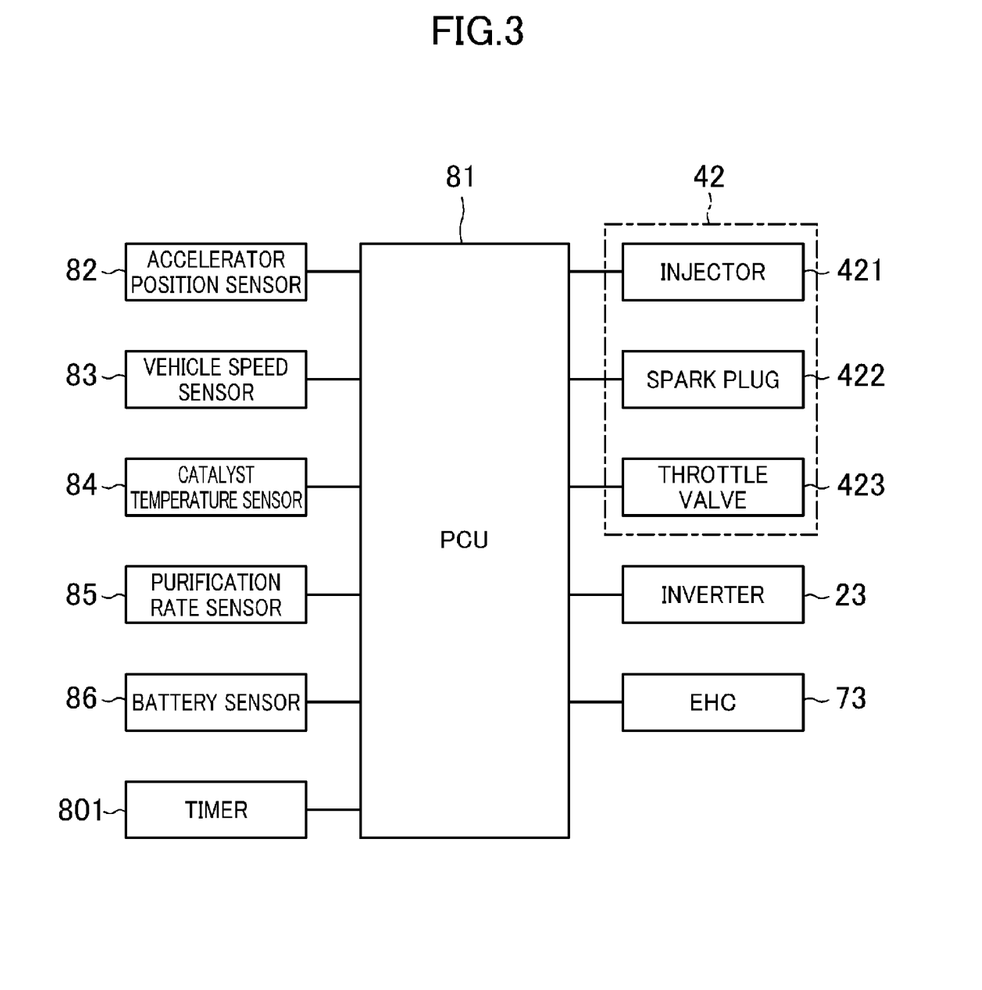
FIG. 3 is a block diagram showing the configuration related to control of a range extender.

FIG. 3 shows a configuration related to running control of the electric vehicle 1 including the range extender 4. The electric vehicle 1 includes a powertrain control unit (PCU) 81 functioning as a controller. Connected to the PCU 81 are an accelerator position sensor 82 for detecting the amount by which an accelerator pedal is depressed, a vehicle speed sensor 83 for detecting a vehicle speed, a catalyst temperature sensor 84 for detecting temperatures of the front and rear stage catalytic portions 71 and 72, a purification rate sensor 85, configured as an $O_2$ sensor, for detecting a purification rate of the catalytic device 7, and a battery sensor 86 for detecting a state of charge (SOC) of the battery 22. The sensors 82-86 each output detection signals to the PCU 81.

The PCU 81 controls the internal combustion engine 42 by outputting a control signal to an injector 421 configured to inject fuel that is to be supplied to the working chambers, a spark plug 422 configured to ignite an air-fuel mixture in the working chambers, and the throttle valve 423 configured to regulate the amount of air that is to be sucked by the internal combustion engine 42. The PCU 81 also outputs a control signal to the inverter 23 to control the electric motor 21 and the generator 41 using the inverter 23. The PCU 81 further controls the ON/OFF states of the EHC 73.

It will now briefly be described how the PCU 81 controls the travel of the electric vehicle 1. The PCU 81 drives the electric motor 21 using the inverter 23 based on the accelerator position, the vehicle speed, and other factors. This allows the electric vehicle 1 to travel based on a request from the driver.

The PCU 81, if the SOC of the battery 22 becomes equal to or below a predetermined value (for example, a predetermined value that is set as appropriate to be 10% or less), starts the internal combustion engine 42 to allow the generator 41 to start generating electricity (i.e., implements an electricity generating operating mode). At the start of the internal combustion engine 42, the generator 41 is supplied with electricity to allow the generator 41 to function as a motor. That is to say, the generator 41 is used as a starter. After the start of the internal combustion engine 42, the PCU 81 operates the internal combustion engine 42 at a preset load and a preset rotational speed such that the generator 41 efficiently generates electricity. While the generator 41 generates electricity, the internal combustion engine 42 is operated at a high load and a high rotational speed. The PCU 81 operates the internal combustion engine 42 such that the SOC of the battery 22 remains at a predetermined value.

In the electric vehicle 1 including the range extender 4, the internal combustion engine 42 is not started to start generating electricity (that is to say, the electricity generating operating mode is not implemented) until the SOC of the battery 22 falls to the predetermined value. In the electric vehicle 1, the start frequency of the internal combustion engine 42 is relatively low. Since the start frequency of the internal combustion engine 42 is low, the internal combustion engine 42 tends to be started in a cold state, and the catalytic device 7 is mostly inactive at the start of the internal combustion engine 42. Thus, at the start of the internal combustion engine 42, an increased amount of emissions may be exhausted into the atmosphere.

Therefore, the electric vehicle 1 including this range extender 4 is configured to reduce exhaust of emissions at the start of the internal combustion engine 42. It will now be described how the PCU 81 controls the internal combustion engine 42 at the start of the internal combustion engine 42 with reference to the time chart shown in FIG. 4.

Figure 4:
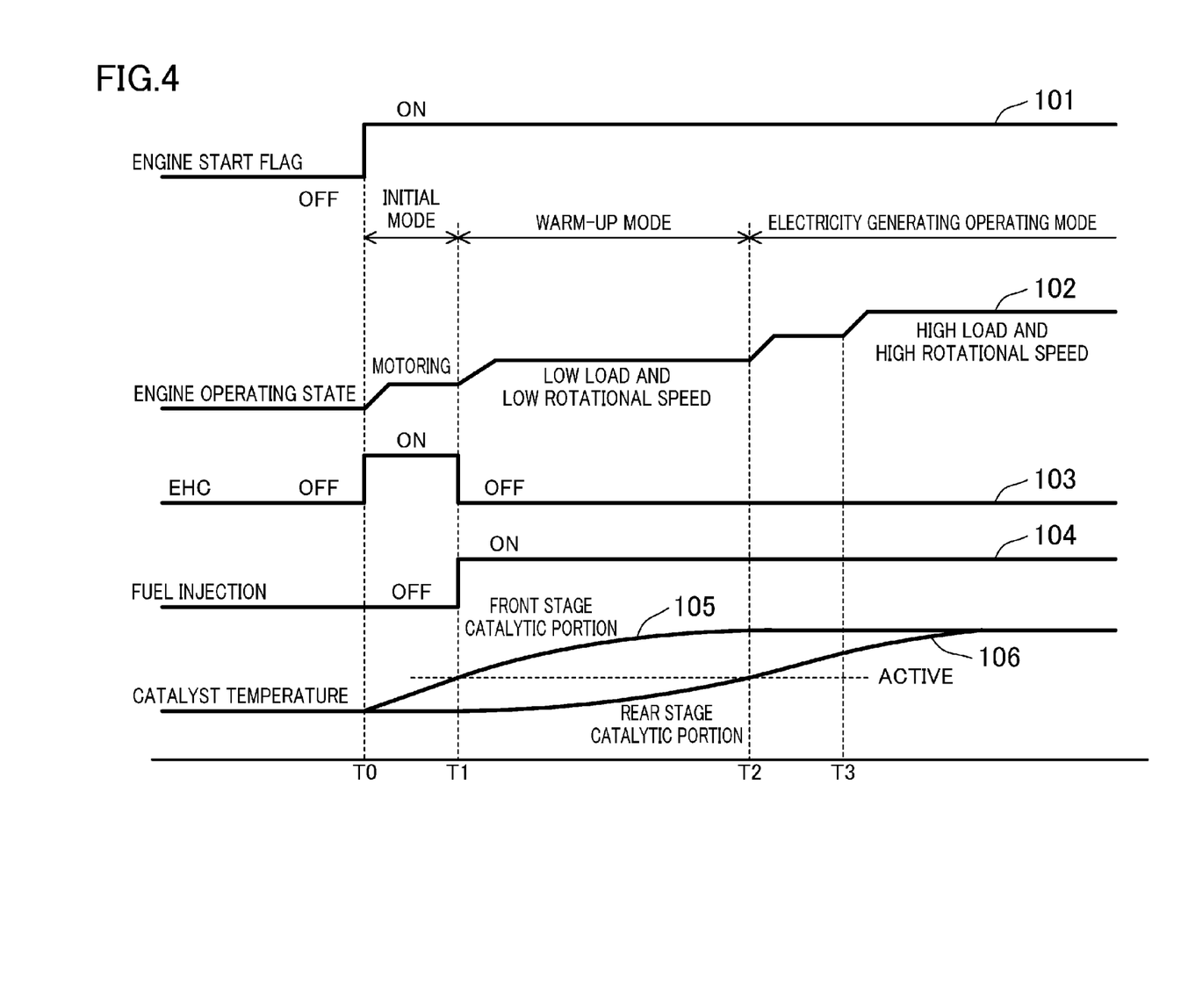
FIG. 4 is a time chart of an engine start flag, an engine operating state, an electrically heated catalyst (EHC) operating state, a fuel injection state, and a catalyst temperature at a start of electricity generation by the generator.

Suppose that a start flag 101 of the internal combustion engine 42 turns ON from OFF at Time T0. In other words, the start flag turns ON when the SOC of the battery 22 falls to the predetermined value. If the start flag 101 turns ON, the internal combustion engine 42 is started to allow the generator 41 to start generating electricity.

In order to start the internal combustion engine 42, the front stage catalytic portion 71 is first activated. To do so, the PCU 81 allows the EHC 73 to turn ON to heat the front stage catalytic portion 71 disposed downstream of the EHC 73, as indicated by the reference character 103. At that time, the PCU 81 supplies the generator 41 with electricity to efficiently heat the front stage catalytic portion 71. Allowing the generator 41 to function as a motor drives the internal combustion engine 42, as indicated by the reference character 102. That is to say, the internal combustion engine 42 is idled without combustion in the internal combustion engine 42. This generates a gas flow in the exhaust passage 6 in an upstream-to-downstream direction. The heat generated at the EHC 73 is sent to the front stage catalytic portion 71 together with this gas flow. As shown in the reference character 105 of FIG. 4, the temperature of the front stage catalytic portion 71 is gradually raised. Promoting activation of the front stage catalytic portion 71 by operating the EHC 73 is hereinafter referred to as an initial mode.

At Time T1, the PCU 81 starts the internal combustion engine 42. That is to say, as indicated by the reference character 104, the PCU 81 allows the injector 421 to start fuel injection and to drive the spark plug 422 at a predetermined timing. The PCU 81 allows the generator 41 to function as a starter at the start of the internal combustion engine 42. The PCU 81 allows the EHC 73 to turn OFF at the start of the internal combustion engine 42 (see the reference character 103). The initial mode ends at Time T1, and a warm-up mode, which will be described later, will start.

At Time T1, as indicated by the reference character 105, the temperature of the front stage catalytic portion 71 reaches an activation temperature. A duration of the initial mode (i.e., T1–T0) may be set in advance, and the PCU 81 may end the initial mode using a timer 801 upon elapse of the preset duration of the initial mode, and may start the warm-up mode. The duration of the initial mode may be set as appropriate according to the capacity of the EHC 73 and/or the operating state of the EHC 73 in the initial mode (i.e., electricity supplied to the EHC 73). The duration of the initial mode may be set to be about ten seconds to about several ten seconds, for example. The PCU 81 may end the initial mode based on the detected temperature of the catalytic device 7, and may start the warm-up mode.

In the warm-up mode after the start of the internal combustion engine 42, the PCU 81 operates the internal combustion engine 42 at a low load and a low rotational speed (see the reference character 102). The output of the internal combustion engine 42 at this time, in other words, the driving force of the internal combustion engine 42 for driving the generator 41 is below a value at which the generator 41 substantially generates electricity, which will be described later. In the warm-up mode, the generator 41 generates a smaller quantity of electricity than a predetermined quantity of electricity to promote the activation of the catalytic device 7, in particular, the rear stage catalytic portion 72. Since high-temperature exhaust gas exhausted from the internal combustion engine 42 after its start is sent to the front and rear stage catalytic portions 71 and 72, the temperatures of the front and rear stage catalytic portions 71 and 72 are gradually raised (see the character references 105 and 106). In the warm-up mode, the front stage catalytic portion 71 is active, and the output of the internal combustion engine 42 is low. This promotes activation of the rear stage catalytic portion 72 while avoiding degradation of emission performance.

In the operating state of the internal combustion engine 42 in the warm-up mode, supposing that the load region of the internal combustion engine 42 is divided equally into two regions, i.e., low and high load regions, the internal combustion engine 42 may be operated at a load which falls within the low load region. Regarding the rotational speed, supposing that the rotational speed region of the internal combustion engine 42 is divided equally into three regions, i.e., low, intermediate, and high rotational speed regions, the internal combustion engine 42 may be operated at a rotational speed which falls within the low rotational speed region. Regarding the rotational speed, supposing that the rotational speed region of the internal combustion engine 42 is equally divided into two regions, i.e., low and high rotational speed regions, the internal combustion engine 42 may be operated at a rotational speed which falls within the low rotational speed region. The internal combustion engine 42 may be operated at, e.g., 1200-1800 rpm.

At Time T2, the PCU 81 ends the warm-up mode, and starts the electricity generating operating mode. At Time T2, as indicated by the reference character 106, the temperature of the rear stage catalytic portion 72 reaches an activation temperature. A duration of the warm-up mode (i.e., T2–T1) may be set in advance, and the PCU 81 may end the warm-up mode upon elapse of the preset duration of the warm-up mode, and may start the electricity generating operating mode. The duration of the warm-up mode may be set as appropriate according to the operating state of the internal combustion engine 42 in the warm-up mode. The duration of the warm-up mode may be set to be about ten seconds to about several ten seconds, for example. The PCU 81 may end the warm-up mode based on the detected temperature of the catalytic device 7, and may start the electricity generating operating mode.

The electricity generating operating mode is a mode in which the generator 41 (substantially) generates a predetermined quantity of electricity. The PCU 81, as indicated by the reference character 102, switches the operating state of the internal combustion engine 42 from the low load and low rotational speed conditions to the high load and high rotational speed conditions. The output of the internal combustion engine 42 is enhanced to a value greater than that in the warm-up mode so as to serve as the driving force for generating electricity (the driving force for generating electricity of, e.g., 10-30 KW), and the generator 41 efficiently generates electricity. Since the front and rear stage catalytic portions 71 and 72 are both activate (see the character references 105 and 106), the emission performance is not degraded even if the internal combustion engine 42 is operated at a high load and a high rotational speed.

In the operating state of the internal combustion engine 42 in the electricity generating operating mode, supposing that the load region of the internal combustion engine 42 is divided equally into two regions, i.e., low and high load regions, the internal combustion engine 42 may be operated at a load which falls within the high load region. The internal combustion engine 42 may be operated at the full load. Regarding the rotational speed, supposing that the rotational speed region of the internal combustion engine 42 is divided equally into two regions, i.e., low and high rotational speed regions, the internal combustion engine 42 may be operated at a rotational speed which falls within the high rotational speed region. The internal combustion engine 42 may be operated at, e.g., 4000-5000 rpm. The internal combustion engine 42 may be operated at the rated speed. The generator 41 and the internal combustion engine 42 may be set to have their characteristics such that electricity is efficiently generated when the output of the internal combustion engine 42 is maximum.

Immediately after switching from the warm-up mode to the electricity generating operating mode, the PCU 81 gradually raises the output of the internal combustion engine 42 in consideration of the purification rate of the catalytic device 7 based on the detection signal of the purification rate sensor 85 (see the character reference 102). In the example of FIG. 4, the PCU 81 operates the internal combustion engine 42 such that the output of the internal combustion engine 42 is higher than that in the warm-up mode before Time T3, and is lower than that after Time T3, i.e., the value of the output at the high load and high rotational speed which is described above. This avoids degradation of emission performance. The generator 41 also generates electricity during a period between Time T2 and Time T3. However, the generator 41 generates less electricity during the period than after Time T3. The PCU 81 does not have to raise the engine output based on the detection of the purification rate of the catalytic device 7. Alternatively, a period (T3−T2) may be set in advance, and the engine output is set to be relatively low until the elapse of the predetermined period using a timer 801, and the PCU 81 may raise the engine output after the elapse of the predetermined period.

As can be seen, the vehicle including the internal combustion engine for driving the generator (i.e., the electric vehicle 1 including the range extender 4) disclosed herein includes: the generator 41 mounted in the vehicle and configured to generate electricity for travelling; the internal combustion engine 42 coupled to the generator 41 and configured to drive the generator 41; the catalytic device 7 provided in the exhaust passage 6 of the internal combustion engine 42 and configured to purify exhaust gas exhausted from the internal combustion engine 42 during the operation of the internal combustion engine 42; and the controller (i.e., the PCU 81) configured to control the operation of the internal combustion engine 42.

At the start of the internal combustion engine 42 to allow the generator 41 to start generating electricity, the PCU 81, until the catalytic device 7 reaches the activated state, operates the internal combustion engine 42 in the warm-up mode such that the driving force of the internal combustion engine 42 is below a value at which electricity is generated after the catalytic device 7 reaches the activated state, and the PCU 81, after the catalytic device 7 reaches the activated state, operates the internal combustion engine 42 in the electricity generating operating mode such that the driving force of the internal combustion engine 42 is enhanced to the value at which electricity is generated to allow the generator 41 to generate a predetermined quantity of electricity.

With such a configuration, the internal combustion engine 42 is operated in the warm-up mode. As a result, the temperature of the exhaust gas is raised and thus, the temperature of the catalytic device 7 is raised. A smaller amount of emissions is exhausted from the internal combustion engine 42 since the output of the internal combustion engine 42 is low and a smaller quantity of fuel is supplied to the internal combustion engine 42. With the gradual rise in temperature of the catalytic device 7 in the warm-up mode, the purification rate of the catalytic device 7 is enhanced. This avoids degradation of emission performance. In the warm-up mode, the activation of the catalytic device 7 is promoted while degradation of emission performance is avoided.

If the catalytic device 7 reaches the activated state, the electricity generating operating mode is implemented. Thus, the output of the internal combustion engine 42 is enhanced. The generator 41 starts generating a predetermined quantity of electricity. In the electricity generating operating mode, the catalytic device 7 is activated, and thus, emission performance is not degraded.

The warm-up mode is implemented prior to the start of the internal combustion engine 42 to allow the generator 41 to starts (substantially) generating a predetermined quantity of electricity. This avoids degradation of emission performance. Also, this allows the generator 41 to rapidly start the electricity generation.

The PCU 81, after switching from the warm-up mode to the electricity generating operating mode, changes the operating state of the internal combustion engine 42 such that the electricity generation ability of the generator 41 is gradually enhanced. That is to say, the output of the internal combustion engine 42 is gradually enhanced along with the increase in purification rate of the catalytic device 7 in the electricity generating operating mode, thereby making it possible to further improve the emission performance.

The electric vehicle 1 further includes an electric heater (i.e., the EHC 73) disposed upstream of the catalytic device 7 in the exhaust passage 6 and configured to heat the catalytic device 7. The PCU 81 implements the initial mode of heating the catalytic device 7 by operating the EHC 73 prior to the warm-up mode.

This allows the EHC 73 to heat the catalytic device 7 in the initial mode, thereby making it possible to promote activation of the catalytic device 7 without exhausting emissions into the atmosphere.

The generator 41 is a generator motor capable of driving the internal combustion engine 42, and the PCU 81 allows the generator 41 to drive the internal combustion engine 42 in the initial mode.

Driving the internal combustion engine 42 generates a gas flow in the exhaust passage 6 in an upstream-to-downstream direction. The heat generated at the EHC 73 is sent to the catalytic device 7 together with this gas flow. This may efficiently raise the temperature of the catalytic device 7.

The catalytic device 7 includes the front stage catalytic portion 71, and the rear stage catalytic portion 72 disposed downstream of the front stage catalytic portion 71. The PCU 81, in the initial mode, heats the front stage catalytic portion 71 using the EHC 73 until the front stage catalytic portion 71 reaches an activated state, and implements the warm-up mode after the front stage catalytic portion 71 reaches the activated state. The PCU 81 also implements the electricity generating operating mode after the rear stage catalytic portion 72 reaches an activated state in the warm-up mode.

This allows the EHC 73 to activate the front stage catalytic portion 71 in the initial mode. This allows for activating the front stage catalytic portion 71 without starting the internal combustion engine 42. After the front stage catalytic portion 71 reaches the activated state, the internal combustion engine 42 is started. This avoids degradation of emission performance since the front stage catalytic portion 71 is activated.

In the warm-up mode, high-temperature exhaust gas exhausted from the internal combustion engine 42 promotes activation of the rear stage catalytic portion 72. This allows for rapidly raising the temperature of the rear stage catalytic portion 72 while avoiding degradation of emission performance. In the warm-up mode of operating the internal combustion engine 42, the operation of the EHC 73 is stopped. This reduces electricity consumption. Also, the EHC 73 is used only to activate the front stage catalytic portion 71, and thereby may have a small capacity. This may reduce the size and weight of the EHC 73.

If the front and rear stage catalytic portions 71 and 72 are both activated, the electricity generating operating mode is implemented. Although the output of the internal combustion engine 42 is enhanced to start (substantially) generating a predetermined quantity of electricity, emission performance is not degraded since the front and rear stage catalytic portions 71 and 72 are both activated.

Here, in the warm-up mode, the generator 41 may be allowed to generate so small quantity of electricity as to be negligible (for example, generating electricity of about 1 KW).

In the above configuration, the EHC 73 is allowed to turn ON in the initial mode to raise the temperature of the front stage catalytic portion 71 to activate the front stage catalytic portion 71. In a configuration with no EHC 73, the internal combustion engine 42 may be started in the initial mode, and the output thereof may be set to be lower than that in the warm-up mode. This may promote the activation of the front stage catalytic portion 71 in the initial mode while avoiding degradation of emission performance.

In the example of control shown in FIG. 4, the three modes, i.e., the initial, warm-up, and electricity generating operating modes are set prior to the start of electricity generation by the generator 41. Of these modes, the initial mode may be omitted. In this case, if the engine start flag turns ON, the internal combustion engine 42 is started to start the warm-up mode. The output of the internal combustion engine 42 is set to be lower in the warm-up mode than that in the electricity generating operating mode. This promotes the activation of the front stage catalytic portion 71 in the warm-up mode while avoiding degradation of emission performance. If the front stage catalytic portion 71 is activated, a transition may be made to the electricity generating operating mode, and the generator 41 may be allowed to start generating electricity while the activation of the rear stage catalytic portion 72 is promoted.

Furthermore, the catalytic device 7 has the front and rear stage catalytic portions 71 and 72 in the above configuration. Alternatively, the catalytic device 7 may have only one catalytic portion.

In addition, the internal combustion engine 42 is configured as a rotary piston engine in the above configuration. Alternatively, the internal combustion engine 42 may be configured as a reciprocating engine.

The technique disclosed herein is applicable not only to the electric vehicle 1 including the range extender but also to a so-called plug-in hybrid vehicle. That is to say, in the vehicle in which the internal combustion engine 42 is not started to allow the generator 41 to start generating electricity until the SOC of the battery is lowered, the catalytic device 7 may be mostly inactive at the start of the internal combustion engine 42. The technique disclosed herein may avoid degradation of emission performance at the start of the internal combustion engine 42, and thus, is also suitable to a plug-in hybrid vehicle.

What is claimed is:

1. A vehicle comprising:
   a generator mounted in the vehicle and configured to generate electricity for travelling;
   an internal combustion engine coupled to the generator and configured to drive the generator;
   a catalytic device provided in an exhaust passage of the internal combustion engine and configured to purify exhaust gas exhausted from the internal combustion engine during an operation of the internal combustion engine; and
   a controller configured to control the operation of the internal combustion engine, wherein
   at a start of the internal combustion engine to allow the generator to start generating electricity,
   the controller, until the catalytic device reaches an activated state, operates the internal combustion engine in a warm-up mode such that a driving force of the internal combustion engine for driving the generator is below a value at which electricity is generated after the catalytic device reaches the activated state,
   the controller, after the catalytic device reaches the activated state, operates the internal combustion engine in an electricity generating operating mode such that the driving force of the internal combustion engine is enhanced to the value at which electricity is generated to allow the generator to generate a predetermined quantity of electricity,
   the device further comprises an electric heater disposed upstream of the catalytic device in the exhaust passage and configured to heat the catalytic device,
   the controller implements an initial mode of heating the catalytic device by operating the electric motor prior to the warm-up mode,
   the generator is a generator motor capable of driving the internal combustion engine, and
   the controller allows the generator to drive the internal combustion engine in the initial mode.

2. The vehicle of claim 1, wherein
   the catalytic device includes a front stage catalytic portion and a rear stage catalytic portion disposed downstream of the front stage catalytic portion, and
   the controller implements the electricity generating operating mode after the front stage catalytic portion reaches an activated state in the warm-up mode.

3. The vehicle of claim 1, wherein
   the controller, after switching from the warm-up mode to the electricity generating operating mode, changes an operating state of the internal combustion engine such that an ability of the generator to generate electricity is gradually enhanced.

4. The vehicle of claim 1, wherein
   the catalytic device includes a front stage catalytic portion and a rear stage catalytic portion disposed downstream of the front stage catalytic portion,
   the vehicle further comprises an electric heater disposed upstream of the catalytic device in the exhaust passage and configured to heat the catalytic device, the controller allows the electric heater to heat the catalytic device until the front stage catalytic portion reaches an activated state prior to the warm-up mode, and implements the warm-up mode after the front stage catalytic portion reaches the activated state, and the controller implements the electricity generating operating mode after the rear stage catalytic portion reaches an activated state in the warm-up mode.

5. The vehicle of claim 4, wherein the controller receives a count signal from a timer, and the controller outputs a signal for stopping the electric heater and a signal for starting the warm-up mode upon elapse of a first preset duration based on the count signal, and outputs a signal for switching from the warm-up mode to the electricity generating operating mode upon elapse of a second preset duration based on the count signal.

6. The vehicle of claim 1, wherein the controller receives a count signal from a timer, and the controller outputs a signal for switching from the warm-up mode to the electricity generating operating mode upon elapse of a preset duration based on the count signal.

7. The vehicle of claim 1, wherein the controller receives a count signal from a timer, and the controller outputs a signal for switching from the initial mode to the warm-up mode upon elapse of a preset duration based on the count signal.

8. The vehicle of claim 1, wherein the vehicle includes a travelling electric motor configured to be operated with electricity of a battery, and the generator and the internal combustion engine serve as a range extender configured to extend a cruising distance of the vehicle if an SOC of the battery is lowered.

9. A vehicle comprising:

a generator mounted in the vehicle and configured to generate electricity for travelling;

an internal combustion engine coupled to the generator and configured to drive the generator;

a catalytic device provided in an exhaust passage of the internal combustion engine and configured to purify exhaust gas exhausted from the internal combustion engine during an operation of the internal combustion engine;

a catalyst temperature obtaining unit configured to obtain a temperature information of the catalytic device; and an engine controller configured to receive a signal from the catalyst temperature obtaining unit and output a control signal to the internal combustion engine, wherein at a start of the internal combustion engine to allow the generator to start generating electricity, the engine controller, until the catalytic device reaches an activated state based on a signal from the catalyst temperature obtaining unit, outputs a signal for operating the internal combustion engine such that a driving force of the internal combustion engine for driving the generator is below a value at which electricity is generated after the catalytic device reaches the activated state, the engine controller, after the catalytic device reaches the activated state based on a signal from the catalyst temperature obtaining unit, outputs a signal for operating the internal combustion engine such that the driving force of the internal combustion engine is enhanced to the value at which electricity is generated to allow the generator to generate a predetermined quantity of electricity, the device further comprises an electric heater disposed upstream of the catalytic device in the exhaust passage and configured to heat the catalytic device, and the engine controller outputs a signal for operating the electric heater prior to the start of the internal combustion engine, and outputs, based on a signal from the catalyst temperature obtaining unit, a signal for stopping the electric heater and a signal for starting the internal combustion engine.

10. The vehicle of claim 9, wherein the internal combustion engine includes an injector configured to inject fuel that is to be supplied to a chamber, a spark plug configured to ignite an air-fuel mixture in the chamber, and a throttle valve configured to regulate an amount of air that is to be introduced into the chamber, and the engine controller outputs a control signal to each of the injector, the spark plug, and the throttle valve.

11. A method of driving a generator using an internal combustion engine in a vehicle, the method comprising:

starting the internal combustion engine configured to drive the generator;

until a catalytic device configured to purify exhaust gas exhausted from the internal combustion engine reaches an activated state, operating the internal combustion engine such that a driving force of the internal combustion engine for driving the generator is below a value at which electricity is generated after the catalytic device reaches the activated state;

after the catalytic device reaches the activated state, operating the internal combustion engine such that the driving force of the internal combustion engine is enhanced to the value at which electricity is generated to allow the generator to generate a predetermined quantity of electricity, operating an electric heater configured to heat the catalytic device prior to the start of the internal combustion engine, and driving the internal combustion engine by the generator when the electric heater is in operation.

12. The method of claim 11, further comprising changing an operating state of the internal combustion engine such that an ability of the generator to generate electricity is gradually enhanced.

* * * * *